US010708779B2

(12) United States Patent
Todasco et al.

(10) Patent No.: US 10,708,779 B2
(45) Date of Patent: Jul. 7, 2020

(54) ELECTRONIC DEVICES FOR WAVE PATTERN DATA TRANSFER

(71) Applicant: PayPal, Inc., San Jose, CA (US)

(72) Inventors: Michael Charles Todasco, Santa Clara, CA (US); Timothy Resudek, San Jose, CA (US); Lucy Ma Zhao, Austin, TX (US); Felipe Albertao, San Jose, CA (US); Braden Christopher Ericson, San Jose, CA (US); Gautam Madaan, San Jose, CA (US); Fun-Chen Jou, San Jose, CA (US); Vidit Maniyar, San Jose, CA (US); Cameron Winter McClees, San Jose, CA (US); Kaili An, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 218 days.

(21) Appl. No.: 15/851,634

(22) Filed: Dec. 21, 2017

(65) Prior Publication Data
US 2019/0200221 A1    Jun. 27, 2019

(51) Int. Cl.
| | |
|---|---|
| *H04L 29/06* | (2006.01) |
| *H04W 12/06* | (2009.01) |
| *G06F 21/44* | (2013.01) |
| *H04W 12/08* | (2009.01) |
| *G06Q 20/20* | (2012.01) |

(Continued)

(52) U.S. Cl.
CPC .......... *H04W 12/06* (2013.01); *G06F 21/445* (2013.01); *G06Q 20/20* (2013.01); *H04L 63/107* (2013.01); *H04W 12/08* (2013.01); *G01H 11/08* (2013.01); *H04W 4/38* (2018.02)

(58) Field of Classification Search
CPC .................................................... G06Q 20/32
See application file for complete search history.

(56) References Cited

U.S. PATENT DOCUMENTS

| | | | | |
|---|---|---|---|---|
| 2006/0223638 | A1* | 10/2006 | Koyama | .............. G07F 17/32 463/47 |
| 2016/0260080 | A1* | 9/2016 | Choi | ................. G06Q 20/3223 |

(Continued)

FOREIGN PATENT DOCUMENTS

| | | | | |
|---|---|---|---|---|
| CN | 104715366 | * | 6/2015 | ............ G06Q 20/32 |
| CN | 106375085 | * | 2/2017 | ............... H04L 9/08 |

OTHER PUBLICATIONS

Block et al., "How to Translate Sight Into Sound? It's All in the Vibrations", Aug. 5, 2014, 4 pages [online], [retrieved on Mar. 19, 2018]. Retrieved from the Internet: <URL:http://www.npr.org/2014/08/05/338099752/how-to-turn-sight-into-sound-its-all-in-the-vibrations>.

*Primary Examiner* — Taghi T Arani
*Assistant Examiner* — Lin Chang
(74) *Attorney, Agent, or Firm* — Haynes and Boone, LLP

(57) ABSTRACT

Methods and systems for electronic devices and platforms that are configured to communicate with a wave pattern are disclosed herein. Such an electronic device may be configured to be placed on a platform. The electronic device may convert a message to be transmitted to a wave pattern. The wave pattern may be a series of vibrations, electronic pulses, or light flashes. The electronic device may then vibrate, send pulses, or flash and the platform may communicate such data to one or more other electronic devices. A receiving electronic device may detect the wave pattern and determine the message from the received wave pattern and respond accordingly.

14 Claims, 5 Drawing Sheets

(51) Int. Cl.
*G01H 11/08* (2006.01)
*H04W 4/38* (2018.01)

(56) References Cited

U.S. PATENT DOCUMENTS

2017/0179986 A1* 6/2017 Roy .................... H04B 1/16
2017/0188198 A1* 6/2017 Matsubara ............. H04B 11/00
2017/0207510 A1* 7/2017 Park .................... H01P 3/165
2017/0213197 A1* 7/2017 Nelms ................ G06Q 20/0855

* cited by examiner

ELECTRONIC DEVICES FOR WAVE PATTERN DATA TRANSFER

BACKGROUND

Field of the Invention

The present invention generally relates to electronic devices, and more particularly to electronic devices configured to communicate data through wave patterns.

Related Art

Electronic devices increasingly communicate through various electromagnetic based communications schemes such as Bluetooth, WiFi, Near Field Communications (NFC), or other such communications schemes that require a special transmitter on a transmitting device and an electromagnetic receiver on a receiving device. However, such communications schemes can be insecure as they can be intercepted or hijacked by third parties. Additionally, devices must be connected through a network in order to communicate through such schemes, which can be inconvenient for devices that are typically not connected to each other (e.g., generally do not have an established WiFi or Bluetooth connection).

Figure 1:
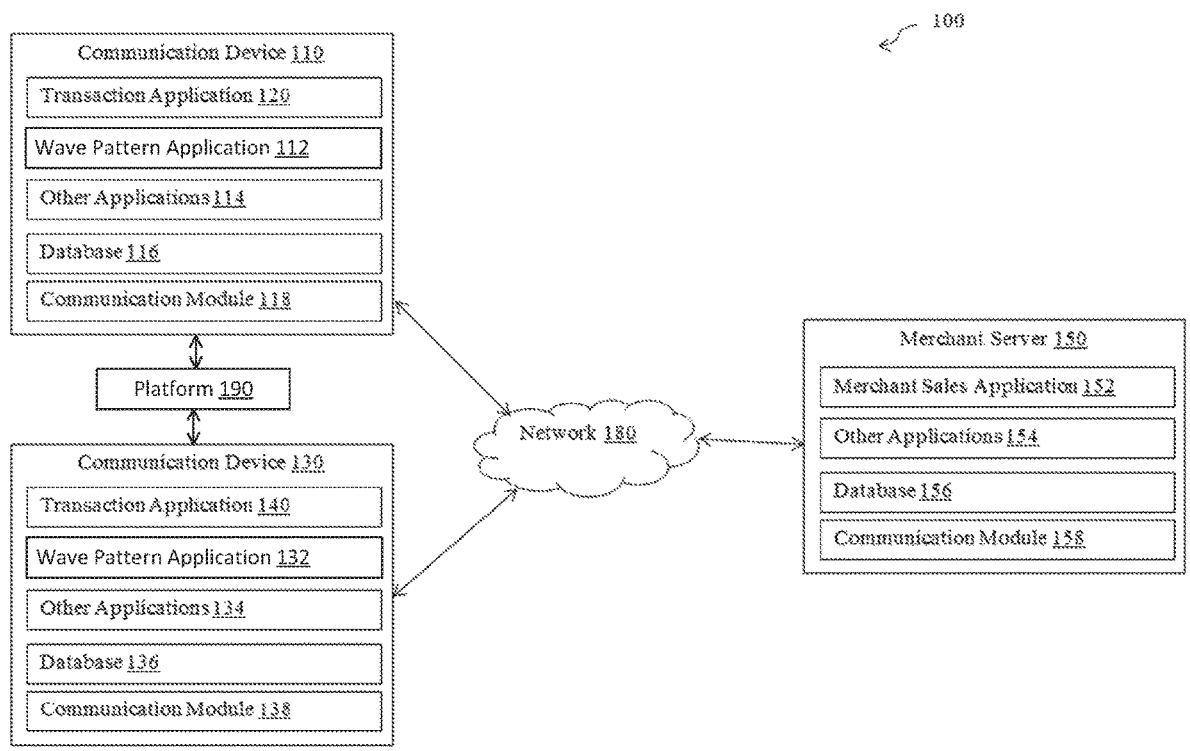
FIG. 1 is a block diagram showing a system according to an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that allow electronic devices to communicate via wave pattern technology, and in particular data communicated through waves. For the purposes of this disclosure, waves may include, for example, vibrations, electrical pulses, sound, and light. For example, two or more electronic devices may communicate through vibrations. The devices may be placed on a tabletop or other medium that can propagate vibrational waves and one device may vibrate to communicate data or a message. Another device may detect the vibrations through the tabletop and determine the message from the vibrations.

Additionally, an apparatus configured to facilitate such wave-based data or information communication may be disclosed herein. The apparatus may include a platform, a first receiver disposed on a first portion of the platform and configured to receive a first electronic device, a second receiver disposed on a second portion of the platform and configured to receive a second electronic device, and a data route communicatively coupled to the first receiver and the second receiver and configured to transfer wave pattern data between the first receiver and the second receiver.

The electronic devices used to communicate wave pattern data described herein may include a wave pattern communication device, a non-transitory memory, and one or more hardware processors coupled to the non-transitory memory and configured to read machine-executable instructions from the non-transitory memory. The instructions may cause the electronic device to perform operations that include determining a message to be sent through a solid body to a secondary device in contact with or communicatively coupled to the solid body, converting the message to an outgoing wave pattern, and communicating the outgoing wave pattern through the solid body to the secondary device.

Transactions may be conducted through communication of wave patterns described herein. Such transactions may include operations such as receiving wave pattern data from a secondary device with a sensor of an electronic device, converting the incoming wave pattern data to a message, determining an instruction from the message, and conducting a transaction according to the instruction.

FIG. 1 is a block diagram showing a system according to an embodiment of the disclosure. As shown, system 100 may include or implement a plurality of devices, platforms, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, iOS®, Android®, or other suitable device and/or server or mobile based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a communication device 130, a platform 190, and a merchant server 150 in communication over a network 180. A user may utilize communication device 110/130 to, for example, conduct one or more transactions, authenticate one or more of the communication device 110/130, and/or communicate with each other. In this regard, wave pattern data may be communicated between electronic devices 110 and 130. Additionally, transaction or authentication data may be communicated between electronic devices 110/130 and merchant server 150 over network 180 to conduct one or more transactions.

Communication device 110, communication device 130, and merchant server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 180 and/or via platform 190.

Communication device 110/130 may be implemented as an electronic device that may utilize appropriate hardware and software configured for wired and/or wireless communication with the other of communication device 110/130 and/or merchant server 150. Additionally, communication device 110/130 may be configured for wave pattern data communication with each other or with other electronic devices. For example, communication device 110 may determine a message to send to communication device 130 and convert the message to wave pattern data. The wave pattern data may be, for example, vibrations transmitted through platform 190 and detected by communication device 130. After communication device 130 detects the vibrations, communication device 130 may determine the message from the vibration. In certain examples, communication device 110/130 may conduct a transaction or otherwise take an appropriate action in accordance with the message.

In one embodiment, communication device 110/130 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable electronic devices, and/or other types of computing devices capable of transmitting and/or receiving wave data, such as an IPAD® from APPLE®. The electronic device may be managed or controlled by any suitable processing device internal or external to the electronic device.

Communication device 110/130 of FIG. 1 may each include a transaction application 120/140, a wave pattern application 112/132, other applications 114/134, a database 116/136, and a communication module 118/138. Transaction application 120/140, wave pattern application 112/132, and other applications 114/134 may correspond to executable processes, procedures, and/or applications with associated hardware. In other embodiments, communication device 110/130 may include additional or different modules having specialized hardware and/or software as required, such as sensors and output devices that can detect and emit waves.

Transaction application 120/140 may correspond to one or more processes to execute software modules and associated devices of communication device 110/130 to conduct one or more transactions associated with the user. In certain embodiments, transaction application 120/140 may allow for a user to conduct one or more transactions using the application and the electronic device. Such an application may be, for example, a dedicated purchasing application linked with a transaction service (e.g., eBay®) or a merchant (e.g., Nordstrom®) or a payment service (e.g., PayPal®). The transaction application 120/140 may also be a plurality of separate applications linked together. Thus, for example, the transaction application 120/140 may be a combination of a purchasing application, a payment application, and a communication application. In various embodiments, transaction applications 120/140 may also include financial applications, such as banking, online payments, money transfer, or other applications.

Wave pattern application 112/132 may correspond to specialized hardware and/or software utilized by a user of communication device 110/130 to communicate wave pattern data between electronic devices 110 and 130 as well as other devices. Thus, wave pattern application 112/132 may, for example, convert a message to be transmitted to another electronic device into wave pattern data. For example, the messages may be converted into a vibration or a series of vibration. In another example, the message may be converted to electronic pulses that may be transmitted through, for example, wireless charging circuitry. Such an example may, thus, have communication device 110 communicate directly with communication device 130 without requiring any messages to be sent to merchant server 150 and/or another merchant device, decreasing the chances of message interception and increasing security.

In certain examples, wave pattern application 112/132 may also include, for example, a vibration motor or wireless charging circuitry. Such vibration motor or wireless charging circuitry may, thus, communicate the wave pattern data between various electronic devices. Thus, wave pattern application 112/132 may communicate with other electronic devices. Additionally, wave pattern application 112/132 may communicate with transaction application 120/140, other applications 114/118, and/or other applications or controllers of communication device 110/130. Wave pattern application 112/132 may interact with such applications and, for example, aid in conducting a transaction between electronic devices 110/130 and/or send messages between electronic devices 110/130.

One or more of the aforementioned features and/or processes of wave pattern application 112/132 may be included within transaction application 120/140 or vice versa. For example, transaction application 120/140 may include communication functions to aid in conducting transactions.

In various embodiments, communication device 110/130 includes other applications 114/134 as may be desired in particular embodiments to provide features to communication device 110/130. For example, other applications 114/134 may include security applications for implementing client-side security features, programmatic client applications for interfacing with appropriate application programming interfaces (APIs) over network 180, or other types of applications. Other applications 114/134 may also include email, texting, voice and IM applications that allow a user to send and receive emails, calls, texts, and other notifications through network 180. Other applications 114/134 may also include other location detection applications, which may be used to determine a location for the user, such as a mapping, compass, and/or GPS application, which can include a specialized GPS receiver that obtains location information for communication device 110/130 and processes the location information to determine a location of communication device 110/130 and the user. Other applications may include social networking applications, media viewing, and/or merchant applications.

Other applications 114/134 may also be associated with other electronic devices, such as biometric tracking devices and other types of accessible or connected devices (e.g., connected to communication devices 110/130 through a Bluetooth® connection). Thus, in certain embodiments, other applications 114/134 may be located or operated on such other electronic devices that are connected to communication devices 110/130 and the output of such operating such other applications 114/134 may then be provided to communicated devices 110/130. Other applications 114/134 may be utilized to determine user data or other information, which may be communicated to service merchant server 150. For example, other applications 114/134 may be associated with a secondary device, such as a biometric tracking device. Thus, other applications 114/134 may collect, capture, and/or otherwise determine user data and other information for the user, which may be used to determine interests and/or knowledge areas of the user. The user's information may correspond to locations of the user, which may further be determined using a location determination system, such as a GPS module of communication device 110/130 and associated systems, calendaring/scheduling information, biometrics, etc. Other applications 114/134 may include device interfaces and other display modules that may receive input from the user and/or output information to the user. For example, other applications 114/134 may contain software programs, executable by a processor, including a graphical user interface (GUI) configured to provide an interface to the user. Other applications 114/134 may therefore use devices of communication device 110/130, such as display devices, including GUIs capable of displaying information to users and other output devices, including speakers. Communication device 110/130 may include input devices, including touch screens. Communication device 110/130 may include one or more sensors or other components used to collect the current information associated with the user, such as an input device, a camera, a microphone, an accelerometer, a motion detector, an environmental sensor, and/or a biometric sensor.

Communication device 110/130 may further include database 116/136 stored on a transitory and/or non-transitory memory of communication device 110/130, which may store various applications and data and be utilized during execution of various modules of communication device 110/130. Thus, database 116/136 may include, for example, identifiers such as operating system registry entries, cookies associated with wave pattern application 112/132 and/or other applications 114/134, identifiers associated with hardware of communication device 110/130, or other appropriate identifiers, such as identifiers used for payment/user/device authentication or identification, which may be communicated as identifying communication device 110/130 to merchant server 150. Database 116/136 may include current and/or historical transaction information as well as any information related to wave pattern data. For example, sequences of wave patterns (e.g., vibration patterns or electronic pulse patterns) may be stored within database 116/136 and such data may be periodically updated. Additionally, database 116/136 may store account information and/or account preferences for an account with merchant server 150. Where applicable, information used by transaction application 120/140 may be stored on database 116/136 (e.g., log-in information, payment information, preferred shopping categories etc.).

Communication device 110/130 includes at least one communication module 118/138 adapted to communicate with communication device 110/130 and merchant server 150. In various embodiments, communication module 118/138 may include a DSL (e.g., Digital Subscriber Line) modem, a PSTN (Public Switched Telephone Network) modem, an Ethernet device, a broadband device, a satellite device and/or various other types of wired and/or wireless network electronic devices including microwave, radio frequency, infrared, Bluetooth, and near field electronic devices. Communication module 118/138 may communicate directly with nearby devices using short range communications, such as Bluetooth Low Energy, LTE Direct, WiFi, radio frequency, infrared, Bluetooth, and NFC.

Platform 190 may be configured to communicate wave pattern data between communication devices 110 and 130. For example, during operation, both communication devices 110 and 130 may be communicatively coupled to or in contact with platform 190, and wave pattern data may be transferred between communication devices 110 and 130 via platform 190 as the communication medium. In certain examples, platform 190 may be a conventional table, but other examples of platform 190 may include dedicated equipment to communicate wave pattern data. Such equipment may be described in further detail in FIG. 3.

Merchant server 150 may be implemented using any appropriate hardware and software configured for wired and/or wireless communication with communication device 110/130. Merchant server 150 may correspond to a device, server, or cloud computing architecture to provide sales of items, for example, through an online marketplace accessible over a network connection with merchant server 150. In certain embodiments, payment may be processed by third party server or application while, in other embodiments, merchant server 150 may further be used to process payments for items and provide incentives for the purchase of items and/or advertisement of items to other users. Although a merchant server is shown, the merchant server may be managed or controlled by any suitable processing device. Although only one merchant server is shown, a plurality of merchant servers may function similarly.

Merchant server 150 of FIG. 1 contains a merchant sales application 152, other applications 154, a database 156, and a communication module 158. Merchant sales application 152 and other applications 154 may correspond to processes, procedures, and/or applications executable by a hardware processor, for example, a software program. In other embodiments, merchant server 150 may include additional or different modules having specialized hardware and/or software as required.

Merchant sales application 152 may correspond to one or more processes to execute modules and associated specialized hardware of merchant server 150 that provide a marketplace to sell one or more items offered by a seller (e.g., user of communication device 110 or 130) or merchant (not shown) associated with merchant server 150, and further provide checkout and payment processes for a transaction to purchase the items for sale from the merchant corresponding to merchant server 150. In this regard, merchant sales application 152 may correspond to specialized hardware and/or software of merchant server 150 to provide a convenient interface to permit a merchant offer items for sale. For example, merchant sales application 152 may be implemented as an application offering items for sale that may be accessed by communication device 110 to present the items for sale to the user associated with communication device 110. In certain embodiments, merchant sales application 152 may correspond to a website available over the Internet and/or online content and/or database information accessible through a dedicated application. Thus, merchant sales application 152 may provide item sales through an online marketplace using the website of the merchant. Additionally, other embodiments of merchant sales application 152 include applications that do not offer items for sale, such as a payment application or an application for communication of funds between various different accounts.

In certain other examples, communication device 110/130 may include some or all of the modules or functionality of merchant server 150 including merchant sales application 152. In such examples, electronic devices 110 and 130 may conduct transaction between each other without use of merchant server 150 and/or while offline. In certain such embodiments, after one or more of communication device 110/130 is online, the communication device 110/130 may confirm the transaction with merchant server 150.

Merchant sales application 152 may include information for a price for the item, a discount for the item, a price change for the item, and/or other incentives for items and/or with the merchant corresponding to merchant server 150 (e.g., rebates, payments, etc.). As described herein, "item"

may prefer to physical items (e.g., tangible goods), services, instruments such as financial transactions (e.g., purchase of options or transfer of funds), and/or any other tangible good, intangible good, or service that may be purchased, rented, or otherwise paid for. Merchant sales application 152 may be used to establish a transaction once the user associated with communication device 110/130 has selected one or more items for purchase. Once a payment amount is determined for the transaction for the item(s) to be purchased, merchant sales application 152 may request payment from the user. Merchant sales application 152 may receive payment processing information, such as a payment and a receipt. In such embodiments, the payment request may be processed, payment provided to the merchant account, and notification of payment (or failure, for example, where there are insufficient user funds) may be sent to merchant sales application 152. The payment may be made by payment provider (e.g., credit card company, online payment provider, autonomous payment provider, and/or other such entity) on behalf of the user associated with communication device 110/130. Merchant sales application 152 may then receive the results of the transaction processing, and complete the transaction with the user, for example, by providing the user the items for the transaction or declining the transaction where the user is not authenticated or the transaction is not authorized (e.g., insufficient funds).

Merchant server 150 includes other applications 154 as may be desired in particular embodiments to provide features to merchant server 150. For example, other applications 154 may include security applications for implementing server-side security features, programmatic client applications for interfacing with appropriate application programming interfaces (APIs) over network 180, or other types of applications. Other applications 154 may also include email, texting, voice and IM applications that allow a user to send and receive emails, calls, texts, and other notifications through network 180. In various embodiments, other applications 154 may include financial applications, such as banking, online payments, money transfer, or other applications to allow processing of transaction with the user. Other applications 154 may contain software programs, executable by a processor, including a graphical user interface (GUI) configured to provide an interface to the user.

Merchant server 150 may further include database 156, which may include, for example, identifiers such as operating system registry entries, cookies associated with merchant sales application 152 and/or other applications 154, identifiers associated with hardware of merchant server 150, or other appropriate identifiers, such as identifiers used for payment/user/device authentication or identification. Identifiers in database 156 may be used by a payment/credit provider to associate merchant server 150 with a particular account maintained by the payment/credit provider. Item, sales, and/or benefit information for items sold by the merchant associated with merchant server 150 may be stored to database 156. Database 156 may further include transaction information and/or results, including transaction histories.

Merchant server 150 includes at least one communication module 158 adapted to communicate with communication device 110/130. In various embodiments, communication module 158 may include a DSL (e.g., Digital Subscriber Line) modem, a PSTN (Public Switched Telephone Network) modem, an Ethernet device, a broadband device, a satellite device and/or various other types of wired and/or wireless network electronic devices including microwave, radio frequency, infrared, Bluetooth, and near field electronic devices.

Network 180 may be implemented as a single network or a combination of multiple networks. For example, in various embodiments, network 180 may include the Internet or one or more intranets, landline networks, wireless networks, and/or other appropriate types of networks. Thus, network 180 may correspond to small scale communication networks, such as a private or local area network, or a larger scale network, such as a wide area network or the Internet, accessible by the various components of system 100.

Figure 2:
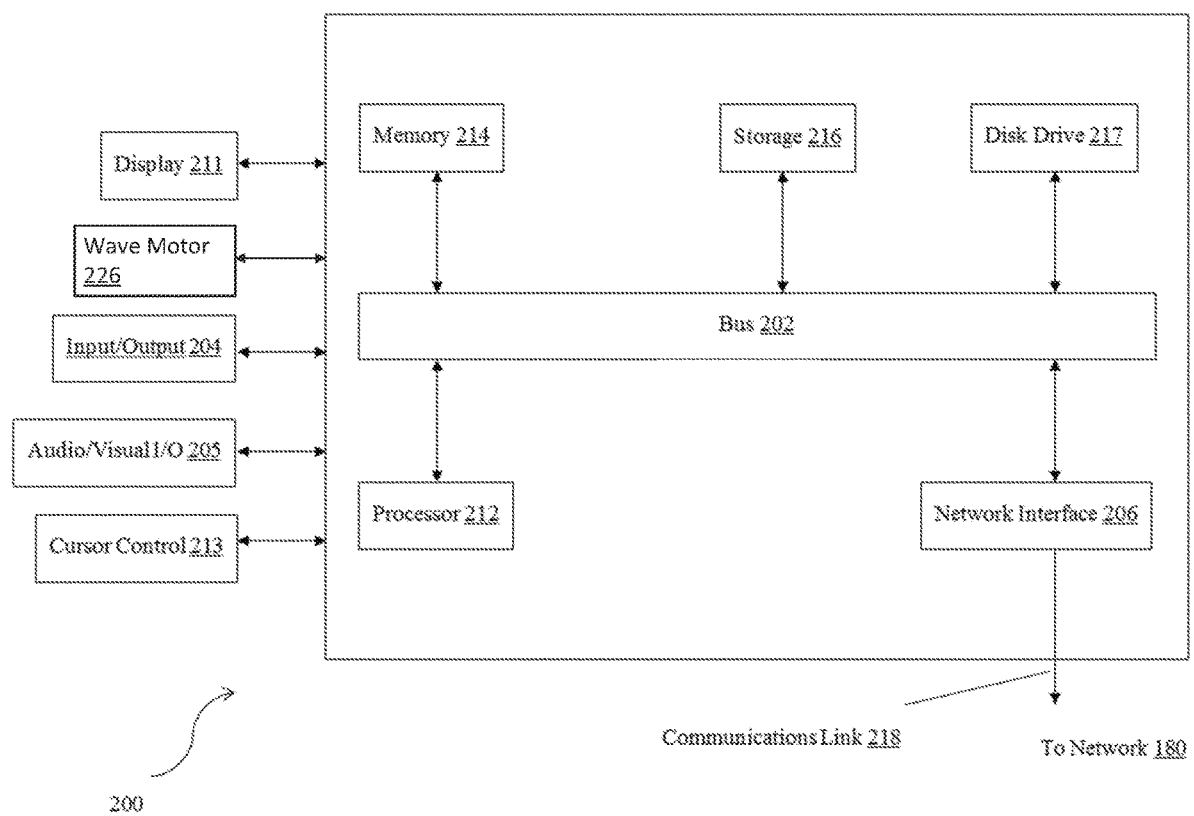
FIG. 2 is a block diagram showing an electronic device according to an embodiment of the disclosure.

FIG. 2 is a block diagram showing an electronic device according to an embodiment of the disclosure. In various embodiments, the electronic device may comprise a personal computing device (e.g., smart phone, a computing tablet, a personal computer, laptop, a wearable computing device such as glasses or a watch, Bluetooth device, key FOB, badge, etc.) capable of communicating with the network or another device through waves. The service provider may utilize a network computing device (e.g., a network server) capable of communicating with the network. It should be appreciated that each of the devices utilized by users and service providers may be implemented as electronic device 200 in a manner as follows.

Electronic device 200 includes a bus 202 or other communication mechanism for communicating information data, signals, and information between various components of electronic device 200. Components include an input/output (I/O) component 204 that can be used to detect and/or emit waves. I/O component 204, which may be comprised of multiple devices, may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between electronic device 200 and other devices, such as another electronic device, service device, or a merchant server via network 180. In one embodiment, the transmission is wireless, although other transmission mediums and methods may also be suitable. One or more processors 212, which can be a micro-controller, digital signal processor (DSP), or other processing component, processes these various signals, such as for display on electronic device 200 or transmission to other devices via a communication link 218. Processor(s) 212 may also control transmission of information, such as cookies or IP addresses, to other devices.

Electronic device 200 may also include a wave motor 226. In various embodiments, wave motor 226 may be configured to, for example, vibrate electronic device 200 to communicate wave pattern data. Other examples of wave motor 226 may be integrated within various other components of electronic device 200. For example, wave motor 226 may be integrated within wireless charging hardware and may be configured to provide electronic pulses through such wireless charging hardware. Additional examples may include, for example, wave motor 226 integrated within one or more lights (e.g., camera light) of electronic device 200 that may flash such lights to communicate data.

Components of electronic device 200 also include a system memory component 214 (e.g., RAM), a static storage component 216 (e.g., ROM), and/or a disk drive 217. Electronic device 200 performs specific operations by processor(s) 212 and other components by executing one or more sequences of instructions contained in system memory component 214. Logic may be encoded in a computer readable medium, which may refer to any medium that participates in providing instructions to processor(s) 212 for execution. Such a medium may take many forms, including but not limited to, non-volatile media, volatile media, and transmission media. In various embodiments, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory computer readable medium. In one example, transmission media may take the form of acoustic or light waves, such as those generated during radio wave, optical, and infrared data communications.

Figure 3:
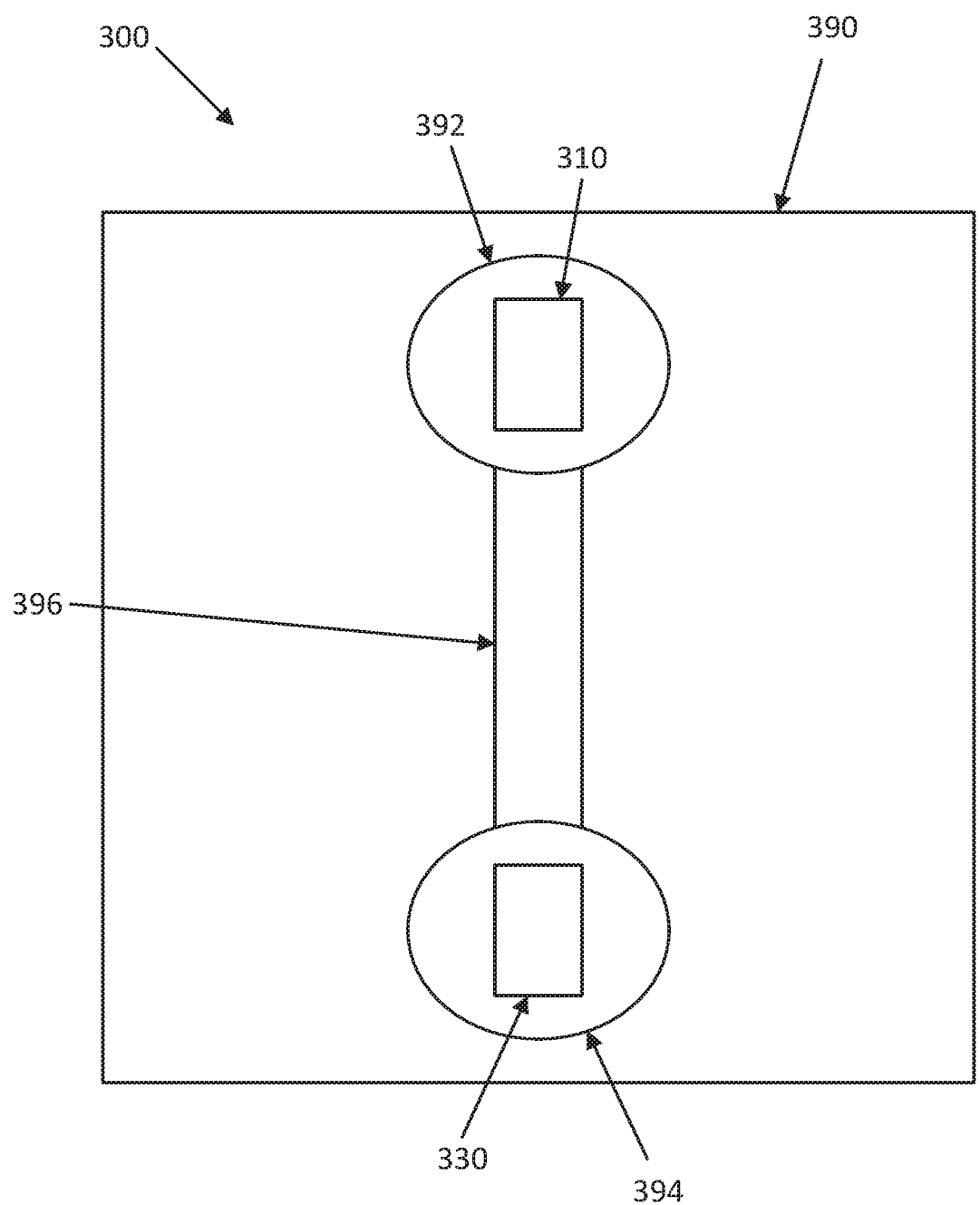
FIG. 3 is a schematic diagram showing an example system according to an embodiment of the disclosure.

FIG. 3 is a schematic diagram showing an example system 300 according to an embodiment of the disclosure. System 300 includes electronic devices 310 and 330 and a platform 390. Platform 390 includes a first receiver 392, a second receiver 394, and a data route or channel 396.

First receiver 392 and second receiver 394 may be configured to receive one or more electronic devices (e.g., electronic devices 310 and 330, respectively). When an electronic device is placed on or within first receiver 392, wave patterns may be transferred between first receiver 392 and second receiver 394 and vice versa via data route 396. While certain embodiments may include first receiver 392 and second receiver 394, other embodiments may include any number of receivers (e.g., one, three, four, or more) or may not include receivers at all. Certain embodiments may transfer wave patterns between electronic devices placed on receivers, while other embodiments may transfer wave patterns to or from a first electronic device not placed on a receiver to a second electronic device placed on a receiver and/or transfer wave patterns between electronic devices that are both not placed on receivers.

Data route 396 may direct or carry wave patterns or enable wave pattern data to be communicated between first receiver 392 and second receiver 394. Where data route 396 directs the wave pattern data, one advantage is that other nearby devices (e.g., within communication range of the wave) do not receive the wave pattern data that is intended only for the device or devices at the end of or along the data route 396, thereby increasing security with data transmissions. In certain embodiments, data route 396 may be, for example, a vibration canal, a wireless charging circuit, a light pipe, and/or other such component that may facilitate movement of wave pattern data. For example, for an embodiment with a vibration canal, the vibration canal may be configured to resonate at certain frequencies to more efficiently (e.g., with less energy loss or distortion) transfer vibrations produced by electronic devices. Electronic devices may be configured to communicate via such resonant frequencies. The vibration canals may be a rigid or semi-rigid surface or component supported at certain intervals to obtain the desired resonant frequency. Certain embodiments of such vibration canals may include mechanisms to adjust resonant frequencies (e.g., through application of weights and/or adjustment of attachment points). A controller within platform 390 may, thus, sense vibrations emitted from the electronic devices and adjust the resonant frequency of the vibration canal to more efficiently transmit wave pattern data.

In other embodiments, the vibration canal may be specifically configured to amplify one or more specific frequencies. Such frequencies may correspond to frequencies that electronic devices are configured to vibrate within. Thus, the vibration canal may communicate vibrations produced by electronic devices.

Furthermore, certain embodiments may control the vibration canal with one or more dampers or springs. Such dampers or springs may "tune" vibrations to specific resonant frequencies despite receiving vibration from electronic devices at other frequencies and/or may control amplitude of the vibrations. In certain such embodiments, once the tuned vibration is received by a receiver, the receiver may further adjust the vibrations to more efficiently communicate the wave patterns.

Other embodiments of data route 396 may include routes based within wireless charging circuits. Electronic devices may, thus, communicate electronic pulses within the wireless charging circuits to other devices placed on receivers while the devices are wirelessly charged. Such electronic pulses may communicate messages between electronic devices. Thus, electronic devices that are wirelessly charging may also communicate with each other through data route 396.

Additionally, data route 396 may also include light pipes. Emitted light of electronic devices (e.g., flash or screens of such electronic devices) may be communicated to the light pipes and light signals may be communicated to other electronic devices. Such lights (e.g., LEDs, camera lights, screens, or other light producing equipment of the electronic device) may flash in a specific manner (e.g., length, intensity, and/or sequence or pattern) to communicate messages.

Certain other embodiments may include receivers that convert specific types of wave pattern data into other types of wave pattern data. Accordingly, vibrations may be converted by the receivers into electronic pulses (e.g., through one or more piezo-electric devices) or light data or vice versa. As such, electronic devices configured to communicate via different types of wave pattern data may still communicate with each other using platform 390.

Figure 4:
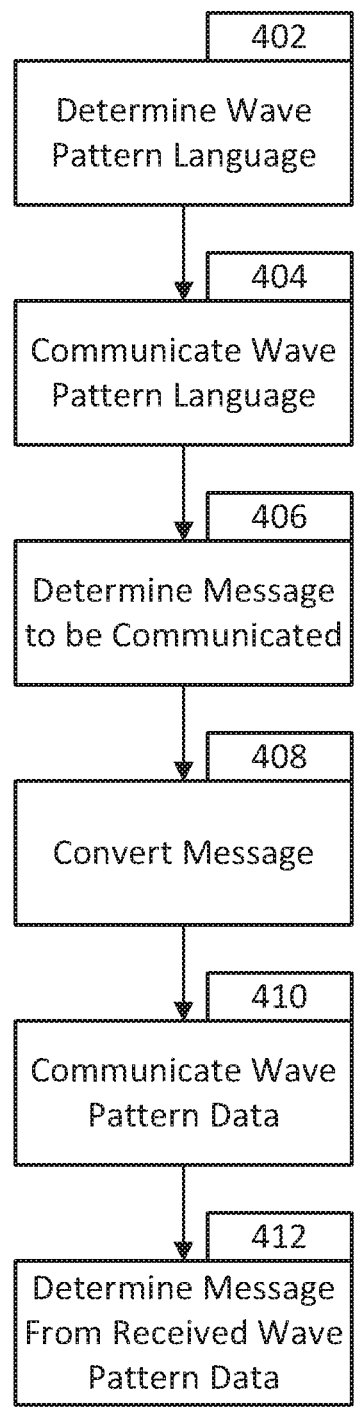
FIG. 4 is a flowchart showing an example of wave pattern communications according to an embodiment of the disclosure.

FIG. 4 is a flowchart showing an example of wave pattern communications according to an embodiment of the disclosure. In block 402, a wave pattern data language may be determined. Determination of the wave pattern data language may include, for example, mapping letters, spaces, symbols, words, phrases, terms, pictorial representations, or other communications to wave pattern data such as a sequence of vibrations, light pulses, electronic pulses, and other such wave pattern data.

For example, specific phrases may be mapped to specific sequences of vibrations. Such mappings may be pre-determined (e.g., by communication device 110 or 130 or by merchant server 150) or may be dynamically determined (e.g., determined when wave pattern data is to be transmitted).

Pre-determined mappings may include mappings determined before use (e.g., created at a time before use or communication to communication device 110/130 for storage within memory of communication device 110/130) that associate a specific sequence with a specific word or phrase. Such pre-determined mappings may be stored within a central database (such as a database of server device described in FIG. 5). One such mapping may be communicated to communication device 110/130 at any period of time and stored within a database of communication device 110/130.

Dynamic mappings may be determined by a processor of electronic device 110/130 (e.g., the processor may determine what a sequence of wave pattern data corresponds to). Such mappings may be determined, for example, prior to communication of wave pattern data. Such mappings may be communicated through a technique different from that of the communication of wave pattern information. For example, such dynamic mappings may be communicated via WiFi, Bluetooth, BLE, or another such wireless communication protocol (e.g., prior to communication of wave pattern data). As such, dynamic mappings may be known only between electronic devices 110 and 130 and may be one time or multi-use mappings for certain specific communications. Such mappings can increase security of wave pattern data transmitted.

In certain embodiments, communication device 110/130 may reference server device to determine that the mapping stored by communication device 110/130 is correct. Such reference may be performed after each update, periodically, or when conditions are met (e.g., after a certain amount of messages communicated through wave pattern data). The mapping may include an identifier, the identifier may be communicated to the server device, and the server device may confirm that the identifier is correct.

In certain embodiments, communication devices 110 and 130 may be associated with each other. For example, communication devices 110 and 130 may be a part of a group (e.g., social network or chat group). The group may have a specific mapping. The mapping may be different from mappings used for other devices and may be pre-determined or dynamically determined. The mapping may be unique to the group. In certain embodiments, communication device 110/130 may store a plurality of mappings. One such mapping may be used for communication within the group and other mapping(s) may be used for communication with other devices.

The mappings may be periodically updated (e.g., by communication of an updated mapping by the server device to communication device 110/130 for storage within memory of communication device 110/130). Any outdated mapping may be deleted from memory of communication device 110/130 following the update. Such mappings may be updated periodically (e.g., updated every week or other period of time), as needed (e.g., when one of the electronic devices lacks knowledge of the wave pattern data language), or when specific update conditions are determined by communication device 110/130 and/or merchant server 150 (e.g., a security breach).

In certain embodiments, for languages that are vibration based, the length, amplitude, and/or frequency of the vibrations may be varied to communicate various content of the message. Thus, for example, a single long vibration for 4 seconds at 20 Hz may be a message equivalent to "wake up Venmo® application" while two vibrations for 1 second each, with the first at 15 Hz and the second at 30 Hz may be equivalent to "transfer agreed amount." In certain such embodiments, certain mappings (e.g., mapping for a vibration sequence that corresponds to a message of "wake up Venmo® application"), the mapping may be universal and used for all electronic devices or all electronic devices using a certain app or within a certain network. Such universal mappings may allow for certain messages to be sent between electronic devices regardless of current mappings that each of the electronic devices are using. Other embodiments may combine wave pattern data with data communicated through other techniques (e.g., Bluetooth®) so that, for example, an amount to be paid may be communicated wirelessly while a payment confirmation is communicated through wave pattern data.

After determination of the wave pattern data language, the wave pattern data language may be provided to communication device 110 and/or 130 in block 404. The wave pattern data language may be communicated through network 180 between electronic devices 110 and 130 and/or merchant server 150.

In certain embodiments, merchant server 150 may determine and/or communicate the wave pattern data language to communication device 110/130, but in other embodiments one of communication device 110 or 130 may determine and/or communicate the wave pattern data language to the other of communication device 110 or 130 and/or merchant server 150. In such an embodiment, the wave pattern data language may, for example, be unique to communications between electronic devices 110 and 130 or may be specifically for a specific transaction or set of transactions. One of the electronic devices 110 or 130 may determine the wave pattern data language through an artificial intelligence process and/or may select one set of wave pattern data language from a plurality of language templates. The language may then be communicated to the other of electronic devices 110 or 130 and/or merchant server 150 (e.g., via wired or wireless communications such as through network 180). Thus, electronic devices 110 and 130 as well as, possibly, merchant server 150 may each have a mapping that may be used to convert a message to wave pattern data. In certain embodiments, only electronic devices 110 and 130 may share such a mapping, and such a mapping may or may not be temporary (e.g., expire after a certain amount of time, after one of the devices has been sensed to be removed from a platform, after a transaction or a series of transaction has been performed, or after another condition has been met) to further increase security of messages communicated between the electronic devices 110 and 130.

In block 406, a message to be communicated from a sending electronic device may be determined. The message may be sent from one or more applications or user commands. For example, a user may start up a Venmo® application on the sending electronic device in preparation for sending payment to the receiving electronic device. A wave pattern data payment option may be selected through a user interface or pre-selected by the user and, thus, the application may determine that a "Wake up Venmo® application" message may need to be communicated to the receiving electronic device to load or launch the Venmo® application on the receiving electronic device.

In block 408, wave pattern data equivalent to the message may then be determined by the sending electronic device. For example, a series of vibrations corresponding to the message of "Wake up Venmo® application" may be determined by the sending electronic device. The sending electronic device may then vibrate, send electronic or light pulses, or otherwise communicate according to the determined wave pattern data or mapping to transmit the wave pattern data to the receiving electronic device in block 410 through platform 390 on which the sending and receiving electronic devices are placed.

While communicating the message via wave pattern data, electronic devices 110 and 130 may be placed on a platform 390 and one or both of electronic devices 110 and 130 may or may not be placed within one or more receivers of platform 390. Electronic devices 110 and 130 may then communicate wave pattern data among each other or from one device to the other. In certain examples, wave pattern data may be communicated through one or more data routes of platform 390. Hence, electronic devices 110 and 130 may communicate through a solid medium without connecting through WiFi, Bluetooth, NFC, or other wired or wireless communication techniques that would allow one of the electronic devices to have a possible backdoor hacking route to the other electronic device.

After wave pattern data is received, the receiving electronic device may determine the message from the received wave pattern data in block 412. The receiving electronic device may thus convert the received wave pattern data to the message (e.g., "decode" the received vibration, electronic or light pulses, or other wave pattern data). For example, the receiving electronic device may note the specific sequence of wave pattern data received (e.g., specific sequence of vibrations received). The wave pattern data received may then be referred against one or more mapping stored within a database of the receiving electronic device. In certain embodiments, the sequence may be broken into a plurality of component parts before or when referring to the mapping (e.g., if the sequence is 3 seconds long, the sequence may be broken down into three 1 second segments for a mapping where each word corresponds specifically to a one second vibration sequence). Referring the wave pattern data against the mapping may then allow the receiving electronic device to determine a message that the wave pattern data correspond to. Also, in certain embodiments, certain applications or devices may include built-in mappings that are universal. Thus, the receiving electronic device may determine that the message of wave pattern data received is "Wake up Venmo® application" as such a message may correspond to a universal built-in wave pattern data specific to the message within the electronic device and/or the Venmo® application and may, thus, correspondingly load or launch the Venmo® application.

Figure 5:
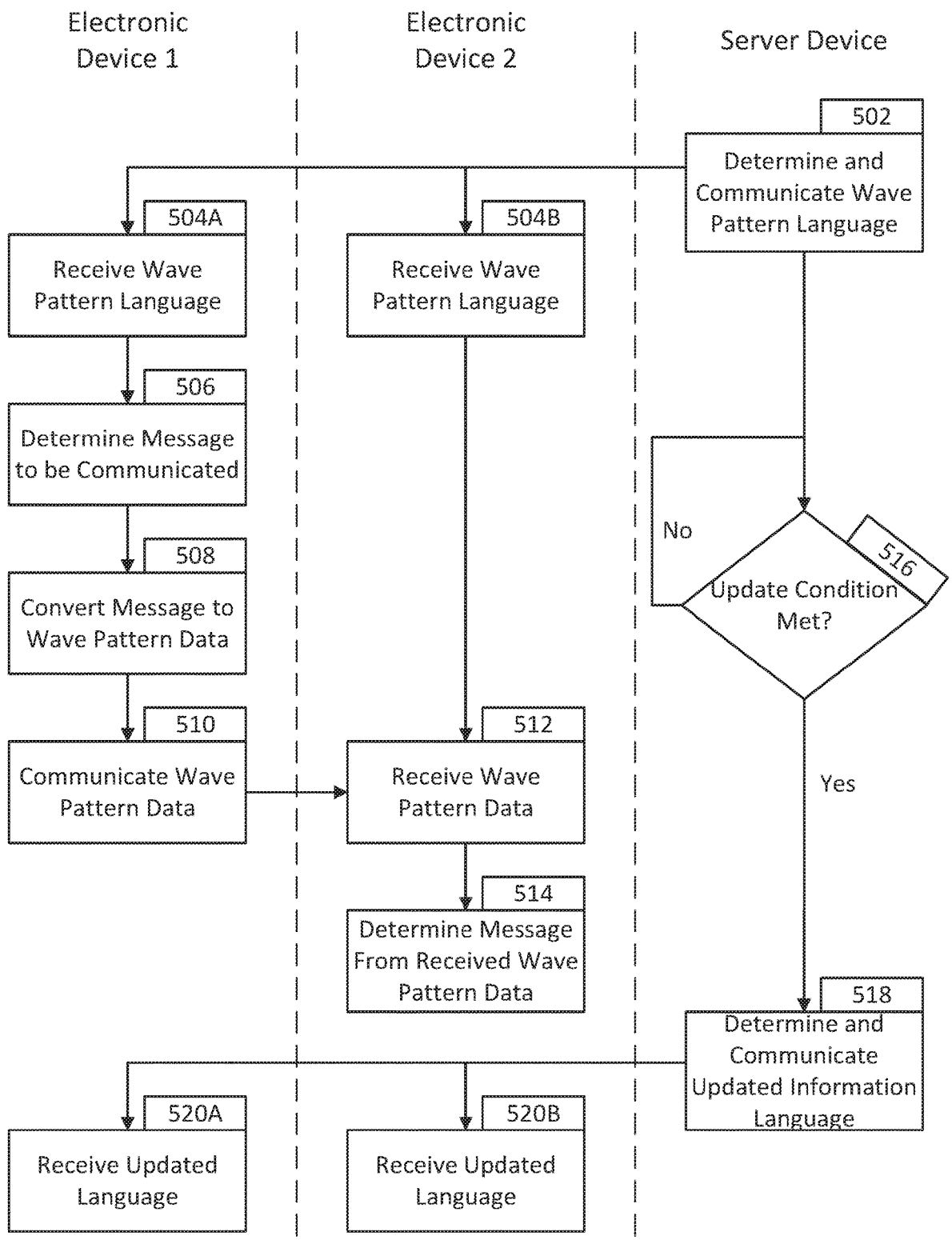
FIG. 5 is a flowchart showing another example of wave pattern communications according to an embodiment of the disclosure.

FIG. 5 is a flowchart showing another example of wave pattern communications according to an embodiment of the disclosure. FIG. 5 is divided into three separate columns corresponding to actions performed by first and second electronic devices and a server device (e.g., a merchant server).

In block 502, wave pattern data language is determined and the wave pattern data language is provided to the electronic devices in blocks 504A and 504B. Blocks 502, 504A, and 504B may include processes and techniques similar to blocks 402 and 404 of FIG. 4. While FIG. 5 illustrates an embodiment where the server device determines the wave pattern data language and provides it to electronic devices, other embodiments may have one or more of the electronic devices and/or a third party determine the wave pattern data language. The wave pattern data may then be provided to the electronic devices and, in certain embodiments, the server device.

In block 506, a message to be communicated is determined. For example, a user may desire to send payment to another person. The user may enter an amount to send to the other person and may select a vibration payment option on an interface of the user's electronic device. In block 508, a message transferring the amount of money selected may then be converted to wave pattern data according to the wave pattern data language, and the amount of money to be sent may be converted to wave pattern data. Blocks 506 and 508 may correspond to blocks 406 and 408 of FIG. 4.

In block 510, the message converted to wave pattern data may be communicated from the first electronic device to the second electronic device. For example, the first electronic device may vibrate according to the determined wave pattern data. Such vibrations may be transferred to the second electronic device through a platform that the first electronic device is placed on. Certain embodiments of the platform may include one of more data routes. The platform and/or data routes may be configured to efficiently transfer the wave pattern data (e.g., may only minimally muffle, distort, or dampen the wave pattern data).

The second electronic device may receive the wave pattern data in block 512. For example, an accelerometer, gyroscope, piezoelectric device, or other sensor may detect that the second electronic device is receiving wave pattern data. Such an accelerometer, gyroscope, piezoelectric device, or other sensor may determine characteristics of the vibration and the second electronic device may then process or store the wave pattern data (e.g., the duration, amplitude, frequency, and other characteristics of the vibrations). The message of the wave pattern data may then be determined in block 514. Block 514 may be similar to block 412 of FIG. 4.

Certain embodiments may, after the message has been received and determined in block 514, include one or more follow up processes. For example, one or both of the electronic devices may then communicate the transfer of data, such as funds, to the server device to confirm the transfer. In certain such embodiments, such communication is exclusive between the first electronic device and the server device and/or the second electronic device and the server device. The exclusive communications, without using the other electronic device as an intermediary device, my further enhance security.

Additionally, in FIG. 5, the wave pattern data language may be updated. In block 516, the server device may determine if an update condition for the wave pattern data language is met. Such an update condition may include, for example, an amount of time since last update, whether the language has determined to have been stolen by a third party, whether a new transaction or series of transaction is requested, whether the first or second electronic device or a user of the first or second electronic device has requested an update, or other such condition. If the condition has been met, then a new wave pattern data language may be determined and communicated to the electronic devices in block 518 and received by the electronic devices in blocks 520A and 520B (e.g., determined from scratch or a separate template selected). Otherwise, the server device may continue checking to see whether the update condition has been met in block 514.

In addition to transactions, wave pattern data may also be used to transmit messages. Thus, electronic devices may securely communicate with each other with minimal risk of interception of messages.

Furthermore, wave pattern data may be used for authentication. For example, a point of sale or financial institution may require a customer to place an electronic device on a platform for authentication purposes before transactions are conducted. The electronic device may then communicate authentication information via wave pattern data that only authorized customers are privy to. If such authentication information (e.g., series of vibrations by the electronic device) corresponds to the proper information stored by the financial institution (e.g., matches), the customer may then be properly authenticated. In such an embodiment, the second electronic device may be connected or integrated with the platform and the platform may include data canals specifically configured to transmit wave pattern data within the format of the authentication information. Upon proper authentication, one or more transactions or transfers may then be affected with the electronic device.

Furthermore, the electronic devices may use wave pattern data to determine a distance between electronic devices. Thus, for example, in block 514 of FIG. 5, after the second electronic device has received the wave pattern data, an intensity or amplitude of the vibrations may be determined. Based on the intensity or amplitude of the vibrations received, the second electronic device may then determine a distance from the first electronic device from the second electronic device. Using such information, the identity of the first electronic device may be determined from a plurality of electronic devices within the vicinity of the second electronic device. Such a technique may be utilized by users who are meeting a stranger for the first time. Proper identification of a person that a user has never met before may thus be desired.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. An apparatus comprising:
   a platform;
   a first receiver disposed on a first portion of the platform and configured to receive physical vibration waves from a first electronic device placed thereon and transmit the physical vibration waves;
   a second receiver disposed on a second portion of the platform and configured to hold a second electronic device placed thereon and receive the physical vibration waves;
   a vibration canal that extends between the first receiver and the second receiver and is configured to carry the physical vibration waves between the first receiver and the second receiver; and
   a controller coupled to the vibration canal and configured to sense the physical vibration waves and adjust a resonant frequency of the vibration canal to facilitate carrying the physical vibration waves between the first receiver and the second receiver, wherein the resonant frequency is adjusted by applying a weight to one or more dampers coupled to the vibration canal at support intervals of the vibration canal.

2. The apparatus of claim 1, wherein the physical vibration waves provide a message to be sent from the first receiver to the second receiver.

3. The apparatus of claim 1, wherein the physical vibration waves are generated and transmitted by the first electronic device at the first receiver, and wherein the physical vibration waves are received by the second electronic device at the second receiver.

4. The apparatus of claim 1, wherein the first receiver is configured to electromagnetically charge a battery of the first electronic device.

5. The apparatus of claim 1, wherein the second electronic device is a point of sale device.

6. A method comprising:
   receiving a user input from an input device of a first computing device;
   determining, from the user input, words of a message to be sent through a vibration canal to a second computing device communicatively coupled to the vibration canal;
   converting each of the words of the message to a respective vibration sequence of an outgoing physical vibration wave pattern based on a mapping between each word and the respective vibration sequence; and
   communicating the outgoing physical vibration wave pattern through the vibration canal to the second computing device, wherein a resonant frequency of the vibration canal has been adjusted, based on the outgoing physical vibration wave pattern to facilitate carrying the outgoing physical vibration wave pattern between the first computing device and the second computing device, by applying a weight to one or more dampers coupled to the vibration canal at support intervals of the vibration canal.

7. The method of claim 6, wherein the communicating comprises vibrating a device body of the first computing device.

8. The method of claim 6, wherein each vibration of the respective vibration sequences maps to a character of the word.

9. The method of claim 8, further comprising receiving the mapping via a wireless communication from the second computing device.

10. The method of claim 9, wherein the mapping is a one-time use mapping to be used for the communicating the outgoing physical vibration wave pattern.

11. The method of claim 6, wherein the outgoing wave pattern comprises authentication information or payment information.

12. The apparatus of claim 1, wherein the controller is configured to adjust the resonant frequency to amplify the physical vibration waves.

13. The method of claim 9, wherein the wireless communication comprises a Bluetooth wireless communication protocol.

14. The method of claim 9, further comprising deleting the mapping from a memory of the first computing device after the communicating the outgoing physical vibration wave pattern.

\* \* \* \* \*